US012717332B2

(12) United States Patent
Böckem et al.

(10) Patent No.: US 12,717,332 B2
(45) Date of Patent: Aug. 25, 2026

(54) TOUCH CONTROL OF UNMANNED AERIAL VEHICLES

(71) Applicant: HEXAGON GEOSYSTEMS SERVICES AG, Heerbrugg (CH)

(72) Inventors: Burkhard Böckem, Jonen (CH); Fabio Diem, Zürich (CH); Pascal Gohl, Zürich (CH); Dimitrios Gryparis, Zürich (CH); Andreas Jäger, Zürich (CH); Tim Oberhauser, Basel (CH); Marko Panjek, Zürich (CH); Lukas Schmid, Zürich (CH); Pascal Strupler, Ennetbaden (CH); Matthias Wieser, Wendlingen (DE)

(73) Assignee: HEXAGON GEOSYSTEMS SERVICES AG, Heerbrugg (CH)

( * ) Notice: Subject to any disclaimer, the term of this patent is extended or adjusted under 35 U.S.C. 154(b) by 478 days.

(21) Appl. No.: 17/349,147

(22) Filed: Jun. 16, 2021

(65) Prior Publication Data

US 2021/0397202 A1 Dec. 23, 2021

(30) Foreign Application Priority Data

Jun. 16, 2020 (EP) .................................... 20180301

(51) Int. Cl.
*G05D 1/00* (2024.01)
*G06F 3/04815* (2022.01)
(Continued)

(52) U.S. Cl.
CPC ........... *G05D 1/101* (2013.01); *G05D 1/0044* (2013.01); *G06F 3/04815* (2013.01);
(Continued)

(58) Field of Classification Search
CPC .... G05D 1/101; G05D 1/0044; G05D 1/0038; G06F 3/04815; G06F 3/0484;
(Continued)

(56) References Cited

U.S. PATENT DOCUMENTS 8,519,997 B2 * 8/2013 Suddreth ................ G01C 23/00
345/419
9,372,593 B2 * 6/2016 King ....................... G06T 13/80
(Continued)

FOREIGN PATENT DOCUMENTS

CN 108021145 A 5/2018
CN 108351649 A 7/2018
(Continued)

OTHER PUBLICATIONS

European Search Report dated Jan. 22, 2021 as received in application No. 20180301.2.

(Continued)

*Primary Examiner* — Kenny Nguyen
(74) *Attorney, Agent, or Firm* — Maschoff Brennan

(57) ABSTRACT

The invention relates to a computer implemented UAV control method comprising, in a target selection mode, the steps of displaying on a touch sensitive display a 3D-view of an environment of a UAV; Overlaying a moveable target indicating symbol to the 3D-view of the environment, wherein the target indicating symbol is moveable in the 3D-view by a touch input; While moving the target indicating symbol, continuously determining a location of the target indicating symbol in the 3D-view and dynamically changing the appearance of the target indicating symbol such that it creates the impression of being displayed in an orientation matching the orientation of a face over which the target indicating symbol is located wherein the orientation of the respective face is derived from stored 3D-data or from (Continued)

the 3D-view; And selecting a target based on the location of the target indicating symbol.

8 Claims, 2 Drawing Sheets

(51) Int. Cl.
*G06F 3/0484* (2022.01)
*G06F 3/0488* (2022.01)
*G08G 5/32* (2025.01)
*G08G 5/55* (2025.01)
*G08G 5/57* (2025.01)

(52) U.S. Cl.
CPC .......... *G06F 3/0484* (2013.01); *G06F 3/0488* (2013.01); *G08G 5/32* (2025.01); *G08G 5/55* (2025.01); *G08G 5/57* (2025.01)

(58) Field of Classification Search
CPC ............... G06F 3/0488; G06F 3/04812; G06F 3/04883; G06F 3/04886; G08G 5/0034; G08G 5/0069
See application file for complete search history.

(56) References Cited

U.S. PATENT DOCUMENTS 9,477,368 B1 * 10/2016 Filip ................... G06F 3/04812
9,563,201 B1 * 2/2017 Tofte .................... G05D 1/0038
10,129,478 B2 11/2018 Zhao et al.
10,197,998 B2 * 2/2019 Steele ................... G06F 3/0346
10,318,809 B2 * 6/2019 Schultz .................. G08G 5/045
10,606,260 B2 * 3/2020 Seiler ...................... G06F 3/013
10,897,567 B2 1/2021 Wang et al.
11,493,938 B1 * 11/2022 Harris .................... G05D 1/106
2010/0073359 A1 * 3/2010 Suddreth ................ G01C 23/00 345/419
2011/0221692 A1 * 9/2011 Seydoux ................ A63H 30/04 345/173
2011/0225538 A1 * 9/2011 Oyagi ..................... A63F 13/26 715/781
2011/0288695 A1 * 11/2011 Gariepy ............... G05D 1/0027 701/2
2013/0135288 A1 * 5/2013 King .................. G06F 3/04812 345/419
2015/0032295 A1 * 1/2015 Stark ................ G06K 19/06131 701/3
2016/0370971 A1 * 12/2016 Hackett ............... G06F 3/03545
2017/0031369 A1 * 2/2017 Liu ...................... G08G 5/0069
2017/0031560 A1 * 2/2017 Filip ....................... G06F 16/29
2017/0185081 A1 * 6/2017 Steele .................... B64U 10/14
2017/0199647 A1 * 7/2017 Richman .............. G05D 1/0016
2018/0002010 A1 * 1/2018 Bauer .................... G05D 1/689
2018/0143636 A1 5/2018 Pinto
2018/0217589 A1 * 8/2018 Kim ..................... H04N 23/631
2018/0362158 A1 * 12/2018 Zhang .................... G05D 1/228
2019/0220002 A1 * 7/2019 Huang ...................... G06T 7/70
2019/0250601 A1 8/2019 Donahoe et al.
2020/0304719 A1 * 9/2020 Shao ...................... H04N 23/60
2021/0084233 A1 * 3/2021 Faaborg ................ G06F 3/0425
2021/0240206 A1 * 8/2021 Michini ................. G01C 11/02

FOREIGN PATENT DOCUMENTS

CN 109791405 A 5/2019
EP 3222051 A1 9/2017

OTHER PUBLICATIONS

CN Office Action dated Mar. 8, 2024 as received in Application No. 202110660746.5.
CN Search Report mailed on Dec. 3, 2024 for application 202110660746.5.
CN Notice of Grant of Invention Patent Rights mailed on Jan. 1, 2025 for application 202110660746.5.

* cited by examiner

TOUCH CONTROL OF UNMANNED AERIAL VEHICLES

FIELD OF THE INVENTION

The disclosure relates to computer implemented methods for touch controlling unmanned aerial vehicles (UAVs).

BACKGROUND TO THE INVENTION

UAVs, especially rotary wing drone type UAVs, have flooded the consumer- and service-market and are being developed to manage a wide variety of tasks in technical and non-technical fields. Typical tasks relate for example to recording movie scenes, freight transportation, inspection of buildings/technical installations, surveying/digitizing physical environments etc. The functionality of UAVs is rapidly increasing as is the complexity of the manageable tasks. A key factor for the success of UAVs on the consumer market relates to their remote controllability which has to be practicable by virtually anyone. Especially, with the increasing complexity of the tasks UAVs have to perform, providing an intuitive, simple and reliable controllability can be challenging. Remote controlling UAVs is typically based on using a control system, an environment sensor system and a motion generation system, wherein the systems are at least communicatively interconnected. The control system controls at least the UAV's propulsion units. The environment sensor system is typically arranged onboard the UAV and senses the environment of the UAV in flight. Sensing typically relates to detecting obstacles in the environment of the UAV in order to avoid collisions. The motion generation system generates control commands based on user input and on sensing signals of the environment sensor system, wherein these control commands are received by the control system. User input is typically received through a graphical user interface (GUI), wherein the GUI presents high-level control commands which can be triggered by the user. Triggering a high-level control command typically results in the execution of numerous complex control commands by the control system finally guiding the movement of the UAV. To present an easily graspable GUI with intuitive top-level control commands, the GUI typically shows a three-dimensional view (3D-view), e.g. a three-dimensional-like representation, of the physical environment of the UAV from a perspective of the UAV which is generated by an onboard camera in a live stream. The GUI is then displaying the 3D-view of the physical environment of the UAV, for example on a two-dimensional display plane of a computing device's screen. Thereby, a simple image generated by a camera of the UAV represents a 3D-view of the physical environment—as it provides a perspective view and thereby comprises depth information—, as is e.g. a 3D-model of the environment, which comprises model-points of the environment with three-dimensional coordinate information. A computing device can be e.g. a tablet computer, a mobile device/phone etc.

SUMMARY OF THE INVENTION

UAVs often perform tasks where they specifically interact with physical objects of their environment, which can be densely built and populated. Therefore, the UAVs need to be reliably and intuitively remote controllable in order to efficiently perform their task and to avoid collisions with obstacles and people accidents. Methods allowing for reliably and intuitively remote controlling UAVs based on displaying a 3D-view of the UAVs' physical environment are needed.

It is object of the present invention to provide for such UAV controlling methods.

Introduced herein is a computer implemented UAV control method for making UAVs more reliably and more intuitively remote controllable in their three-dimensional (3D) physical environment. The method seems particularly relevant for controlling UAVs, which rely on an interaction with physical objects in their physical environment in order to fulfill their designated task.

A typical UAV is moveable in 3D space above ground along multiple axes. These axes are usually defined by controlling the propulsion units of the UAV and the inclination of the UAV. Depending on the type of UAV the inclination is directly controllable by controlling the propulsion units. Then, the axes along which the UAV is moveable are controllable by only controlling the propulsion units. Moving a UAV along an axis is a complex maneuver which is further complicated by the fact that the movement is remotely controlled from a remote position. Therefore, remote controlling UAV's has been simplified to a level, where waypoints or targets are indicatable by the user to the UAV. Then, the UAV autonomously flies to the indicated waypoint or target. Thereby, the motion generation system generates control commands based on the UAV's actual position and the indicated waypoint or target. The control commands are received by the UAV's control system based thereon the movement of the UAV is triggered. In flight, the motion generation system continuously updates the control system with control commands based on input received from the UAV's environment sensor system.

Navigating a UAV based on indicating targets or waypoints to which the UAV is autonomously moveable is an intuitive principle and typically applied in remote controlling UAVs. Thereby, the indication of the target or waypoint to the UAV is one of the key actions to be taken by the user. To make such UAV navigation intuitive, reliable and simple, indicating the waypoint or target to the UAV must be intuitive, reliable and simple.

Herein disclosed is a computer implemented UAV control method which allows a user to remote control a UAV based on making a target or waypoint intuitively and reliably selectable and indicatable to the UAV. Thereby, the target or waypoint is selectable within a target selection mode in a displayed 3D-view of the UAV's environment, wherein the 3D-view is displayed on a touch sensitive screen.

The invention relates to a computer implemented UAV control method comprising, in a target selection mode, the steps of:

- displaying on a touch sensitive display a 3D-view of an environment of a UAV,
- overlaying a moveable target indicating symbol to the 3D-view of the environment, the target indicating symbol being moveable in the 3D-view by a touch input, and
- while moving the target indicating symbol
  - continuously determining a location of the target indicating symbol in the 3D-view, and
  - dynamically changing the appearance of the target indicating symbol such that it creates the impression of being displayed in an orientation matching the orientation of a face over which the target indicating symbol is located, the orientation of the face being derived from stored 3D-data or from the 3D-view, and selecting a target based on the location of the target indicating symbol.

The computer implemented UAV control method enables the control of an UAV upon execution by a computing device. The steps of the UAV control method can advantageously be realized within the general frame of a GUI or with other words as part of a GUI. The GUI typically renders the interface for receiving user input and is part of a UAV control device setup comprising a control system, an environment sensor system and a motion generation system, wherein the systems are at least communicatively interconnected. Such a typical UAV control device setup functions based on the principle outlined above.

The steps comprised by the UAV control method, according to the invention, are realizable within a target selection mode. The target selection mode can be a selectable control mode besides a plurality of further control modes. The target selection mode is providing functionalities specifically relating to the selection of a target or waypoint and providing information on the selected target or waypoint to the UAV.

The touch sensitive display is part of a computing device such as e.g. a mobile phone, tablet computer, laptop etc. The computing device is communicatively connected to the UAV. The communicative connection typically is a wireless connection enabling a data transfer using air/vacuum as transmission medium.

The 3D-view relates to a three-dimensional-like representation of the physical environment surrounding the UAV. The UAV's position is referenced to the 3D-view. Thereby, the locations or positions of objects, targets or waypoints in the 3D-view are directly translatable into their corresponding locations or positions in the physical environment of the UAV. The three-dimensional-like representation is displayed on a two-dimensional display plane of a computing device's screen. The 3D-view can be e.g. a camera image provided by a camera onboard the UAV or can be generated e.g. based on a live video stream from a camera onboard the UAV or based on a 3D point cloud carrying three-dimensional information of the environment surrounding the UAV, e.g. in the form of three-dimensional coordinates of points of the environment surrounding the UAV. This comes to the advantage that already common touch inputs such as e.g. touch gestures known for example from GPS- or digital map-navigation applications can be used for interacting with the displayed environment of the UAV.

Within the target selection mode, a target indicating symbol is overlaid to the displayed 3D-view of the UAV's environment. The target indicating symbol by its appearance and location in the 3D-view indicates—as further explained below—an underlying selectable target or waypoint. The target indicating symbol is overlaid to the 3D-view, meaning it is arranged on the display to appear to be on top of the displayed 3D-view. The target indicating symbol is moveable within the 3D-view by a touch input. A touch input can relate e.g. to a touch gesture by which the target indicating symbol is touched with a finger and dragged from a first location to a second location within the 3D-view. A touch input can also relate to touching and thereby activating a displayed virtual control button resulting in effecting a movement of the target indicating symbol within the 3D-view.

The physical environment represented in a 3D-view being generated e.g. based on images of a live video stream from a camera onboard the UAV can typically comprise static objects e.g. natural landscape elements, buildings, technical installations, roads, monuments etc. and moving objects e.g. driving or flying vehicles, people, animals etc. By applying common feature recognition algorithms diverse object types in the 3D-view can be automatically recognized and identified. Based thereon geometric features of the objects are as well determinable. In case of static objects such as e.g. buildings, technical installations or monuments determinable geometric features can relate to e.g. contours, faces forming the object, orientation of such faces and the objects, textures of faces etc. For example, by using a common feature recognition algorithm a house comprising walls with windows and a roof can be automatically recognized and identified. Then, the orientation, within the 3D-view, of each recognized wall can be determined as well as the orientation of the house with respect to e.g. the roof ridge.

Alternatively, the 3D-view can be generated based on stored 3D-data e.g. based on a 3D point cloud comprising 3D point cloud data with each point comprising at least three-dimensional coordinate information. In this case, geometrical features of objects in the 3D-view can either be directly derived from point cloud data stored with the point cloud or automatically be recognized and identified applying a feature recognition algorithm to the 3D point cloud data.

During movement of the target indicating symbol, its location in the 3D-view is continuously determined and recorded by the computing device. Thereby, continuously determining the location can mean to determine the location at a given rate/frequency, e.g. the frequency being within the range of 1 to 500 Hz. The determination itself is a discrete event but continuously repeated. It can also mean that the location is consecutively determined, wherein the intervals between different determination events are not constant. The as disclosed meaning of continuously is valid throughout the disclosure. Based on the determined location of the target indicating symbol, objects underlaying the target indicating symbol are identifiable. Thereby, geometric features of an object underlaying the target indicating symbol are accessible for dynamically changing—based on the geometric features—the appearance of the target indicating symbol. According to the invention the appearance of the target indicating symbol is dynamically changing in order to create the impression to adapt or match its orientation to an orientation of a face to which the target indicating symbol is momentarily overlaid.

Based on the location of the target indicating symbol in the 3D-view and its appearance a target or waypoint associated with the location of the target indicating symbol is selectable. A target can be e.g. a part of an object such as a wall of a building or a roof of a house. A target can also be e.g. a point/region of an object or of a part of an object such as e.g. a point/region on the ground.

Known principles of indicating a target or waypoint to a UAV based on displaying a 3D-view of the UAV's environment in a GUI rely on a UAV control method identifying a user input and selecting a target or waypoint based on the identified user input. Thereby, the user does not receive feedback relating to a selectable target or waypoint during performing the input. Therefore, performing the user input according to known principles on a 3D-view, which represents a truly three-dimensional physical environment on a two-dimensional display plane, often results in performing several repeated user inputs until the correct target or waypoint is selected.

It has been recognized that it is a disadvantage, if the selection of a target or waypoint is presented to a user only after having completed the input for selecting it. To overcome this disadvantage, the method according to the invention provides a feedback on selectable targets or waypoints to the user during performing the input, e.g. during performing a touch gesture on a touch screen of a computing device, in order to select a target or waypoint. The herein disclosed method provides a feedback to the user by overlaying a moveable target indicating symbol to the 3D-view, by continuously determining the location of the target indicating symbol and by dynamically changing the appearance of the target indicating symbol in accordance with geometrical features of objects to which the target indicating symbol is overlaid to. Thereby, a user is continuously updated with a feedback related to identifying selectable targets or waypoints during performing a touch input in order to select a target or waypoint. This assists the user in selecting the correct target or waypoint at a first try and thereby improves the efficiency and at the same time the intuitiveness and reliability in selecting a target or waypoint and indicating the target or waypoint to a UAV.

According to an embodiment of the invention, the computer implemented UAV control method comprises the step of dynamically changing the appearance of the target indicating symbol such that it further changes its shape and/or color based on a texture of the face.

For example, in case the geometric feature being related to the texture of a face the appearance of the target indicating symbol can be changed based on the texture of the face underlaying the target indicating symbol. Thereby, the target indicating symbol can create the impression to adapt or match its orientation to an orientation of a face to which the target indicating symbol is momentarily overlaid and change its shape and/or color as a function of the texture of the underlaying face. Thereby, it can be indicated to a user whether the target indicating symbol is overlaid e.g. to a roof or to a façade of a building.

According to a specific embodiment of the invention, the computer implemented UAV control method further comprises the steps of

- while the target indicating symbol is statically located over a face, overlaying an actuable target confirmation symbol to the 3D-view,
- upon actuating the target confirmation symbol
  - selecting the target based on the location of the target indicating symbol, and
  - instructing the UAV having a distance measuring module with a horizontally oriented field of view to
  - fly to a target location having a predefined relative position relation to the target, and
  - orient the UAV towards the target, such that the measuring field of view is facing the target.

The herein disclosed control method seems to be particularly advantageous to be applied for controlling UAVs which rely on an interaction with physical objects in their environment in order to fulfill their designated task. Such a UAV can have a distance measuring module, e.g. arranged in its front section, and have the task to e.g. digitize sceneries or landscapes or survey objects. The distance measuring module can be e.g. a light detection and ranging (lidar) module and enable the measurement of coordinate information used to determine coordinates, e.g. 3D-coordinates, of points of the physical environment of the UAV, by determining a distance and direction to the points. The distance measuring module has a measuring field of view making points of the physical environment of the UAV within this measuring field of view measurable. The distance measuring module is arranged such that the measuring field of view is horizontally oriented. The arrangement of the distance measuring module at the UAV influences the orientation of the UAV during flight with respect to e.g. an object or scenery to be surveyed or digitized. Using the herein disclosed method to control such a UAV allows a user to intuitively and reliably select a target or waypoint which can be related e.g. to a wall of a building which has to be surveyed or digitized. To further improve the reliability in selecting the correct target or waypoint an actuable target confirmation symbol can be overlaid to the 3D-view, while the target indicating symbol is statically located over a face which represents a selectable target. The actuable target confirmation symbol can be e.g. checkmark shaped symbol and by being touched effect the selection of the previously indicated selectable target or waypoint. After the selection of the target or waypoint, e.g. being located on a face in the 3D-view representing a wall of a building, the UAV is instructed by its motion generation system to fly to a target location, which has a predefined positional relationship to the selected target or waypoint. As an example, if the selected target relates to a wall of a building to be measured the target location can be at a position in front of the wall, e.g. at a specific distance to the wall, and at a specific vertical position relating to the height above ground. Thereby, the predefined relative position relation to a target can be predefined based on a user input or can be automatically predefined, e.g. by the motion generation system, based on parameters/criteria related to the task to be fulfilled by the UAV, e.g. in case the UAV has the task of measuring a face of an object the predefined relative position relation can be predefined based on the desired resolution of resulting measurement. Furthermore, the UAV is oriented to face the target such that the horizontally oriented measuring field of view is as well facing the target. The situation where the UAV is positioned and oriented in front of the target at the target location can render the starting point from which the UAV flies along the face, e.g. along the wall of a building, by following an automatically generated flightpath pattern. Thereby the wall of the building is autonomously digitizable or surveyable.

According to a specific embodiment of the invention creating the impression of being displayed in an orientation matching the orientation of a face over which the target indicating symbol is located, is based on projecting the target indicating symbol onto the face and displaying the projection of the target indicating symbol.

According to a further embodiment of the invention the target indicating symbol can be a ring-shaped symbol. Depending on the orientation of the face to which the target indicating symbol is overlaid, the appearance of the ring-shaped symbol can change from an undistorted circularly shaped ring symbol to any kind of distorted elliptically shaped ring symbol.

According to a further specific embodiment of the invention the 3D-data is derived from two-dimensional images provided by a camera of the UAV in a live-view of the environment. The UAV is typically equipped with a camera which generates at a given frame rate two-dimensional images of the UAV's physical environment. The UAV's position is determinable and trackable as well as its orientation and/or viewing angle of the camera. In flight, same regions of the physical environment are imaged from different positions and different viewing angles. To each two-dimensional image the actual position of the UAV/camera and the actual viewing angle is assignable. Based thereon 3D-data of the physical environment is determinable. Alternatively, algorithms known as visual simultaneous localization and mapping (vSLAM) algorithms may be applied to generate 3D-data from the physical environment of the UAV from two-dimensional images.

According to a further specific embodiment of the invention the 3D-data is based on a 3D-point cloud comprising at least measured 3D-coordinates of object points of the UAV's environment. The 3D-coordinates of the object points can result from a measurement with common geodetic surveying equipment, e.g. total station, theodolite, laser scanner etc.

According to a further specific embodiment the 3D-coordinates of the object points are measured by the distance measuring module of the UAV. For example, the UAV can be moved across the region which has to be surveyed or digitized in a first exploratory flight. During the exploratory flight 3D-coordinates of points of the environment are measured with a coarse resolution in order to mainly capture outlines of objects or landscape elements. Based on the as-captured outlines of objects in the environment 3D-data to be used for controlling the UAV according to the invention can be stored.

According to a further embodiment of the invention selecting a target based on the location of the target indicating symbol refers to selecting the face over which the target indicating symbol is located as target. Then, the control method further comprises the steps of determining a flight path running along the selected face and at a predefined distance to the selected face, and further instructing the UAV to fly, while the measuring field of view is facing the selected face, along the flight path.

Thereby the flight path can run along the selected face for example at a constant predefined distance to the selected face. The distance can be predefined based on a user input. Alternatively, the distance of the flight path to the face can vary along the flight path based on predefined parameters/criteria. Then, the varying distance to the face can automatically be predefined based on criteria/parameters related to the task to be fulfilled by the UAV, e.g. in case the UAV has the task of measuring a face of an object the varying distance can be automatically, e.g. by the motion generation system, predefined based on the desired resolution of the resulting measurement.

A further aspect of the invention relates to a further control method, the steps of which are realizable within a further selectable UAV manipulation mode.

Thereby, the invention relates to a computer implemented UAV control method comprising, in a UAV manipulation mode, the steps of displaying on a touch sensitive display a 3D-view of an environment of a UAV, displaying a UAV symbol representing the UAV with its position and orientation in the environment in the 3D-view, providing a movability of the UAV symbol in the 3D-view in at least two of three movement modes, a first movement mode providing a restricted movability of the UAV symbol in a horizontal plane, a second movement mode providing a restricted movability of the UAV symbol along a vertical axis being perpendicular to the horizontal plane, and a third movement mode providing a restricted movability of the UAV symbol around the yaw axis of the UAV symbol, wherein in each of the movement modes the UAV symbol is movable by a touch input, each of the movement modes is individually selectable by a touch input, and a switchability between the movement modes is provided, and while moving the UAV symbol continuously determining a location and orientation of the UAV symbol in the 3D-view.

The steps of the control method being realizable within the UAV manipulation mode can advantageously be realized within the general frame of the same GUI or with other words as part of the same GUI which is providing for the realizability of the control method related to the target selection mode.

A UAV symbol is displayed in/overlaid to the displayed 3D-view of the UAV's environment. The UAV symbol by its location and orientation, in particular and by its shape and appearance, in the displayed 3D-view represents the UAV with its position and orientation in the physical environment. The UAV's position is referenced to the 3D-view. Thereby, the locations or positions of the UAV symbol or objects in the 3D-view are directly translatable into their corresponding locations or positions in the UAV's physical environment. Three movement modes are selectable by the user, e.g. by actuating via a touch input a virtual mode selection button of the GUI or overlaid to the 3D-view, within which the UAV symbol is provided with a restricted movability. A first movement mode provides a movability of the UAV symbol in the 3D-view which is restricted to a horizontal plane. For example, based on a touch input the UAV symbol can be dragged only to positions lying in the horizontal plane. Based thereon an intuitive controllability of the UAV in a simulated depth plane to the two-dimensional display plane is providable. A second movement mode provides a movability of the UAV symbol being restricted to a movement along a vertical axis. The vertical axis is arranged perpendicular to the horizontal plane. For example, based on a touch input the UAV symbol can be dragged only to positions lying on the vertical axis. Based thereon an intuitive controllability of the UAV's vertical position relating to its height above ground is providable. A third movement mode provides for a movability of the UAV symbol being restricted to a rotation of the UAV symbol around its yaw axis. For example, based on a touch input the UAV symbol's orientation can be changed by rotating the UAV symbol only around its yaw axis. Based thereon an intuitive controllability of the UAV's orientation in a horizontal plane is providable. During all the movements of the UAV symbol its location and orientation within the 3D-view is determined and tracked. The as-tracked location/position and orientation of the UAV symbol can directly be provided to the motion generation system of the UAV in order to instruct the UAV to move in its physical environment in accordance to the movement of the UAV symbol in the 3D-view.

Known principles of navigating a UAV through its physical environment based on displaying a 3D-view of the UAV's environment in a GUI, rely on a UAV control method identifying a user input and instructing the UAV to move based on the identified user input. After having completed the input the actual movement of the UAV is triggered. Thereby, the user does not receive feedback, relating to the position/location to which the UAV will be instructed to be moved or relating to the orientation which the UAV will take, during performing the input. Therefore, performing the user input according to known principles to a 3D-view, which represents a truly three-dimensional physical environment on a two-dimensional display plane often results in performing several repeated user inputs until the UAV is moved to the desired position/location or is oriented in the desired direction. Furthermore, such principles bear a higher collision risk.

It has been recognized that it is a disadvantage, if the user is not provided with a visual feedback during performing the user input in order to move the UAV.

Thereby the method provides a visual feedback on the location/position and orientation of the UAV symbol to the user during performing the input, e.g. during performing a touch gesture on a touch screen of a computing device, in order to move the UAV. The feedback is provided to the user by displaying/overlaying a moveable UAV symbol to the 3D-view, by continuously determining the location of the UAV symbol and by dynamically changing the appearance of the UAV symbol in accordance with the location/position and orientation it has in the 3D-view. Thereby, a user is continuously updated with a feedback related to grasping the location/position and orientation of the UAV symbol in the 3D-view during performing a touch input in order to move the UAV. This assists the user in safely navigating the UAV in its three-dimensional environment. Thereby, the risk of collisions is reduced, wherein the efficiency and at the same time the intuitiveness and reliability of remote controlling the UAV is increased.

According to an alternative embodiment of the invention the UAV symbol is actuable, and the method further comprises the step of upon actuating the UAV symbol displaying a further UAV symbol in the 3D-view, the further UAV symbol statically representing the UAV with its position and orientation in the environment in the 3D-view meanwhile the UAV symbol is moveable within each of the three movement modes.

The UAV symbol can then be actuated for example based on a touch input e.g. by touching the UAV symbol. The UAV symbol can then be in the form of a UAV ghost symbol and typically exhibit a certain level of transparency in order to keep the 3D-view uncluttered. The further UAV symbol remains static at its position/location in the displayed 3D-view, meanwhile the UAV ghost symbol is moveable to a desired position/location and orientation in the 3D-view. For example, based on using the UAV ghost symbol and a further static UAV symbol, a user is enabled to position and orient the ghost symbol in the 3D-view before the corresponding movement is indicated to the UAV by the motion generation system.

According to an alternative embodiment of the invention the method further comprises the steps of while the UAV symbol is unmoved, overlaying an actuable UAV position and orientation confirmation symbol to the 3D-view, and upon actuating the UAV position and orientation confirmation symbol instructing the UAV to change its position and orientation based on the determined position and orientation of the UAV symbol in the 3D-view.

To further improve the reliability in positioning and orienting the UAV, an actuable UAV position and orientation confirmation symbol can be overlaid to the 3D-view, while the UAV symbol is statically located in the 3D-view. The actuable UAV position and orientation confirmation symbol can be e.g. checkmark shaped symbol and based on a touch input, e.g. by being touched, effect the instruction of the UAV through the motion generation system to move to a position and orient itself in accordance to the position and orientation of the UAV symbol.

According to a specific embodiment the method further comprises displaying two arrow-shaped actuable symbols, upon their actuation the UAV symbol is moveable in the corresponding arrow direction on a horizontal plane within the first movement mode.

According to a further specific embodiment the method further comprises the step of overlaying an actuable vertical yaw axis of the UAV symbol as vertical axis to the 3D-view upon its actuation the UAV symbol is moveable along the vertical yaw axis within the second movement mode.

According to an alternative embodiment the method further comprises the step of providing an actuable front section of the UAV symbol upon its actuation the UAV symbol is rotatable around its yaw axis within the third movement mode and/or providing the UAV symbol with an actuable ring-shaped symbol surrounding the UAV symbol upon its actuation the UAV symbol being rotatable around its yaw axis within the third movement mode, wherein the UAV symbol is rotated around its yaw axis based on the actuated location/position on the ring-shaped symbol.

According to a further embodiment the method within the second movement mode further comprises the steps of displaying in the 3D-view a horizontal grid plane with a horizontal grid at the vertical position of the UAV symbol, the grid plane dynamically adjusting its vertical position to the UAV symbol's vertical position, in particular the grid plane fading after a predefined distance from the UAV symbol, and/or dynamically highlighting points in the 3D-view, where the horizontal grid meets an object, and/or displaying and dynamically adjusting interpenetration curves of objects interpenetrating the horizontal grid plane, wherein the highlighted points and/or displayed interpenetration curves make the vertical position of the UAV symbol indicatable to a user while the UAV symbol is moved along the vertical axis.

Thereby, the user is provided with a feedback on the vertical position of the UAV symbol during moving the UAV symbol. This enables a simple control of the vertical position relating to the height of the UAV, especially in a 3D-view provided on a two-dimensional display plane of a touch sensitive display.

The invention further relates to a computer program product comprising instructions which, when the program is executed by a computer cause the computer to carry out the UAV control method according to the invention.

Thereby a computer can comprise a multitude of computing subunits, wherein the subunits collaborate in executing the instructions.

BRIEF DESCRIPTION OF THE DRAWINGS

By way of example only, an embodiment of the invention will be described more fully hereinafter with reference to the accompanying figure, wherein.

DETAILED DESCRIPTION OF THE DRAWINGS

Figure 1:
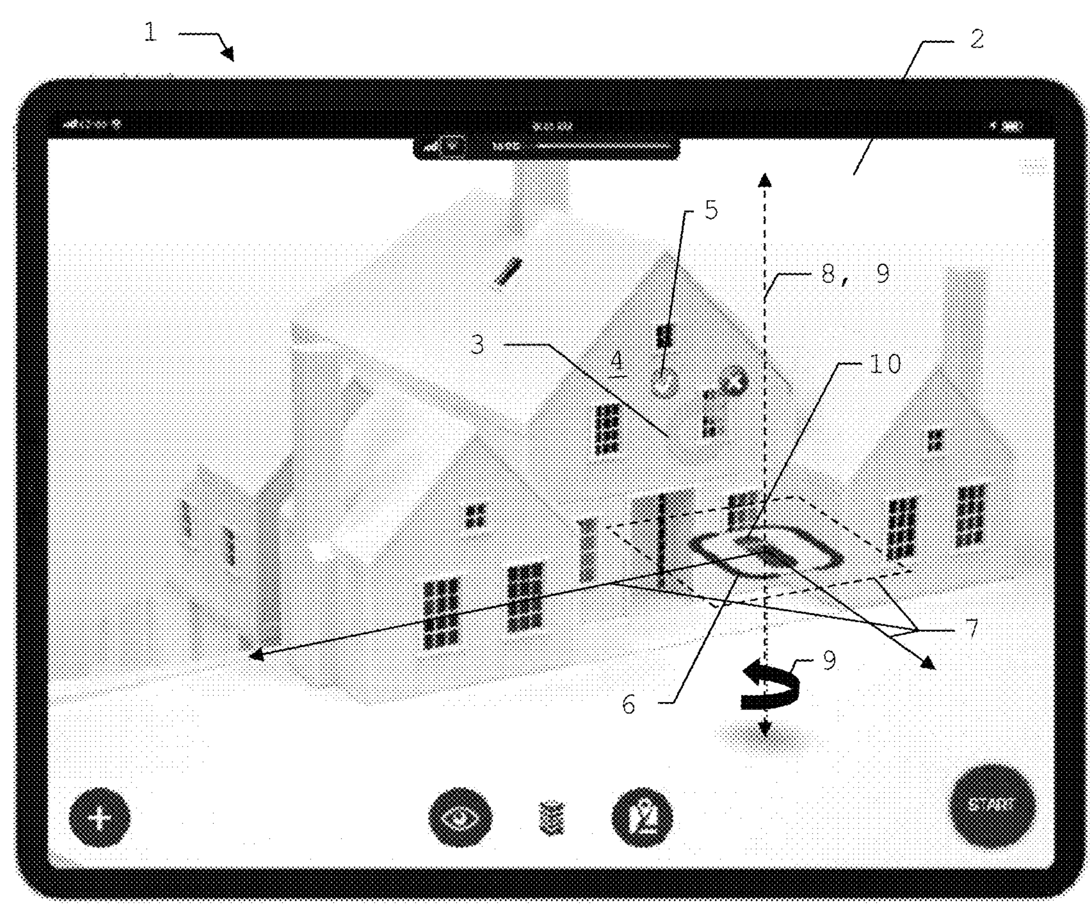
FIG. 1 shows a possible GUI and integrated therein the inventive concepts related to the method steps of the target selection mode and the UAV manipulation mode.

FIG. 1 shows a mobile computing device in the form of a tablet computer. The tablet computer has a touch sensitive display 1 for receiving user input/touch input based on touching the display with one or more fingers or with a touch pen. The 3D-view 2 of the physical environment of a UAV is displayed on a two-dimensional display plane of the touch sensitive display. The 3D-view 2 is a rendering of the UAV's physical environment. The rendering typically is based on point cloud data comprising at least three-dimensional coordinate information of points of the physical environment of the UAV. Alternatively, the 3D-view can be provided by displaying an image recorded by a camera onboard the UAV.

Overlaid to the 3D-view is a ring-shaped target indicating symbol 3. The target indicating symbol 3 exhibits some degree of transparency to keep features of the 3D-view to which the target indicating symbol 3 is overlaid visible. The target indicating symbol 3 is moveable in the displayed 3D-view based on user input. User input is typically related to touching the target indicating symbol with a finger or touch pen and dragging it to the desired location in the 3D-view. During dragging the target indicating symbol to the desired location its appearance is dynamically adjusted such that the impression is created that its orientation matches the orientation of the momentarily underlying face e.g. face 4. After placing the target indicating symbol 3 at the desired location in the 3D-view a target confirmation symbol 5 can be overlaid to the 3D-view, e.g. in proximity to the target indicating symbol as illustrated in FIG. 1. Then, the user is provided with the possibility to confirm or deny the target selection by actuating the target confirmation symbol or e.g. a target denial symbol. In case of the situation illustrated in FIG. 1 confirming the target selection based on a touch input, e.g. by touching the target confirmation symbol with a finger or touch pen, wall 4 of the house is selected as target. The target selection is then indicated to the motion generation system of the UAV. The motion generation system being communicatively connected to the tablet computer, to the UAV's control system and to the UAV's environment sensor system can then automatically determine a target location based on predefined criteria. The as-determined target location is then indicated by the motion generation system to the control system of the UAV. The control system receiving and executing the commands from the motion generation system moves the UAV to the determined target location. According to the situation illustrated in FIG. 1 the target location is determined to be in front of the house wall 4 and at a predefined distance to the house wall 4 and above ground. The UAV being equipped with a distance measuring module, e.g. in its front section, is moved to the target location and oriented towards the house wall 4, such that the measuring field of view is facing the house wall 4. This situation can then be the starting point for performing the task of surveying/scanning/digitizing house wall 4. Then a flight path along house wall 4 is automatically determinable based on the 3D-data used for rendering the scene. The UAV—and the measuring field of view—facing house wall 4 is enabled to autonomously measure house wall 4 by following the as-determined flight path.

Overlaid to the 3D-view in FIG. 1 is a UAV symbol 6. The UAV symbol 6 by its location/position and appearance represents the UAV to be controlled. The UAV symbol further indicates a front section comprising a distance measuring module 10. The position of the UAV symbol 6 within the 3D-view represents in a true to scale manner the actual position of the UAV in its physical environment. Furthermore, positions/locations in the 3D-view are referenced to their actual counterparts in the physical environment. FIG. 1 further illustrates features related to the UAV manipulation mode making controlling the UAV intuitive and simple. The user may select and switch between one of three different movement modes. In a first movement mode a user can move based on a touch input the UAV symbol only within the horizontal plane 7 in which the UAV symbol is located. In a second movement mode a user can analogously move the UAV symbol only along a vertical axis 8, which can be the yaw axis 9 of the UAV symbol. In a third movement mode a user can only rotate the UAV symbol around its yaw axis 9. The location/position and orientation of the UAV is continuously determined and tracked and can be processed by the motion generation system in order to instruct through the control system the UAV to move in accordance to the movement of the UAV symbol. The UAV symbol can be manipulated by the user through changing its position/location and orientation. Furthermore, it is possible to overlay an actuable position and orientation confirmation symbol to the 3D-view, e.g. in proximity to the UAV symbol, as soon as the UAV symbol is statically located in the 3D-view. By actuating the position and orientation confirmation symbol the position and orientation of the UAV symbol is communicated to the motion generation system instructing the UAV to fly to the corresponding position in its physical environment and orient itself according to the orientation of the UAV symbol.

Figure 2:
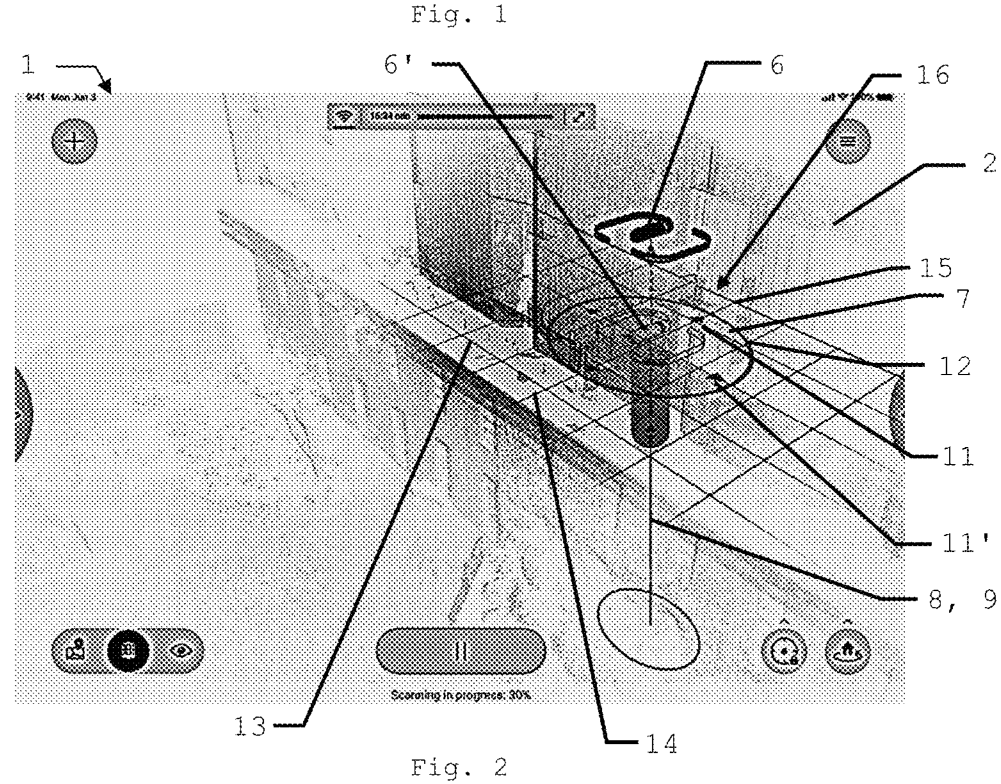
FIG. 2 shows a possible GUI and integrated therein the inventive concepts related to the method steps of the UAV manipulation mode.

FIG. 2 shows a GUI with a 3D-view 2 of the physical environment of a UAV. The 3D-view 2 of the physical environment is displayed on a two-dimensional display plane of a touch sensitive display 1. The 3D-view 2 is a three-dimensional representation of the UAV's physical environment and is based on point cloud data comprising at least three-dimensional coordinate information of points of the physical environment of the UAV.

Displayed in the 3D-view in FIG. 2 is a UAV symbol 6. The UAV symbol 6 by its appearance represents the UAV to be controlled. The UAV symbol 6 further indicates a front section comprising e.g. a distance measuring module. In the 3D-view a further UAV symbol 6' is displayed. The further UAV symbol 6' within the 3D-view represents in a true to scale manner the actual position of the UAV in its physical environment. Furthermore, positions/locations in the 3D-view are referenced to their actual counterparts in the physical environment.

FIG. 2 further illustrates features related to the second movement mode where a user can move the UAV symbol 6 only along a vertical axis 8, which can be the yaw axis 9 of the UAV symbol 6. The location/position and orientation of the UAV 6 is continuously determined and tracked and can be processed by the motion generation system in order to instruct through the control system the UAV to move in accordance to the movement of the UAV symbol 6. The UAV symbol can be manipulated by the user through changing its position/location along axis 8, 9. Furthermore, it is possible to overlay an actuable position confirmation symbol to the 3D-view, e.g. in proximity to the UAV symbol 6, as soon as the UAV symbol is statically located in the 3D-view. By actuating the position confirmation symbol the position of the UAV symbol 6 on the axis 8, 9 is communicated to the motion generation system instructing the UAV to fly to the corresponding position in its physical environment.

In the 3D-view of FIG. 2, the first movement mode providing a movability of the UAV symbol 6, which is restricted to a horizontal plane 7 is indicated without being active. For example, based on a touch input the UAV symbol 6 can be dragged only to positions lying in the horizontal plane 7. Based thereon an intuitive controllability of the UAV in a simulated depth plane to the two-dimensional display plane is providable.

In the 3D-view of FIG. 2, features related to the third movement mode are indicated without being active. An actuable ring-shaped symbol 12 surrounding the further UAV symbol 6' upon its actuation the UAV symbol 6 being rotatable around its yaw axis 9 within the third movement mode, wherein the UAV symbol 6 is rotated around its yaw axis based on the actuated location/position on the ring-shaped symbol 12.

In the 3D-view of FIG. 2 a horizontal grid plane 13 with a horizontal grid 14 at the vertical position of the further UAV symbol 6' is displayed. The grid plane 13 indicates—in the example shown in FIG. 2—the vertical position of the further UAV symbol 6'. Advantageously, the grid plane 13 will adjust its vertical position to the UAV symbol's 6 vertical position and thereby makes the vertical position of the UAV symbol 6 indicatable to the user. Furthermore, the grid plane 13 is fading after a predefined distance from the further UAV symbol 6'.

In the 3D-view of FIG. 2 dynamically highlighted points 15, where the horizontal grid 14 meets an object, here the façade of the building, are highlighted. Furthermore, the interpenetration curve 16 of the object, here a building, interpenetrating the horizontal grid plane 13 is displayed. The highlighted points and/or displayed interpenetration curve make the vertical position of the further UAV symbol 6' indicatable. Advantageously, the highlighted points and/or displayed interpenetration curve move along the vertical axis together with the UAV symbol 6 and thereby make the vertical position of the UAV symbol 6 indicatable to a user while the UAV symbol 6 is moved along the vertical axis.

Figure 3:
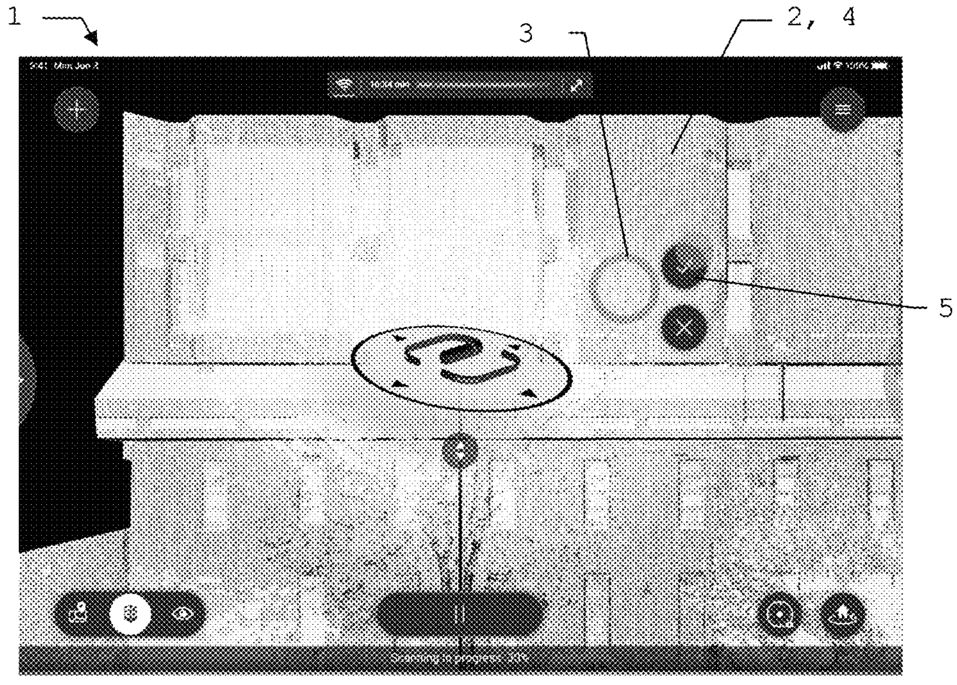
FIG. 3 shows a possible GUI and integrated therein the inventive concepts related to the method steps of the target selection mode and the UAV manipulation mode.

Overlaid to the 3D-view of FIG. 3 is a ring-shaped target indicating symbol 3. During dragging the target indicating symbol 3 to the desired location its appearance is dynamically adjusted such that the impression is created that its orientation matches the orientation of the momentarily underlying face e.g. face 4. A target confirmation symbol 5 is overlaid to the 3D-view, e.g. in proximity to the target indicating symbol.

The invention claimed is:

1. Computer implemented UAV control method while surveying a surveying target, comprising, in a target selection mode, the steps of:

- displaying on a touch sensitive display a 3D-view of an environment of a UAV, the UAV having a distance measuring module that has a measuring field of view, is embodied as a LIDAR module, and is configured for surveying the surveying target,
- overlaying a moveable surveying target indicating symbol to the 3D-view of the environment,
- while moving the surveying target indicating symbol in the 3D-view by a touch input:
  - continuously determine a location of the surveying target indicating symbol in the 3D-view, and
  - provide visual feedback on the location of the surveying target indicating symbol by dynamically changing the appearance of the surveying target indicating symbol such that the appearance creates an impression of the surveying target indicating symbol being displayed in an orientation matching an orientation of a face over which the surveying target indicating symbol is located, the orientation of the face being derived from stored 3D-data or from the 3D-view, and dynamically changing the appearance of the surveying target indicating symbol such that the appearance of the surveying target indicating symbol further changes its shape and/or color based on a texture of the face over which the surveying target indicating symbol is located,
- selecting the surveying target to be surveyed with the distance measuring module based on a location of the surveying target indicating symbol, wherein selecting the surveying target based on the location of the surveying target indicating symbol refers to selecting a face over which the surveying target indicating symbol is located as the surveying target,
- determining a flight path running along the selected face and at a predefined distance to the selected face, and
- further instructing the UAV to fly, while the measuring field of view is facing the selected face, along the flight path.

2. Computer implemented UAV control method according to claim 1, comprising the steps of:

- while the surveying target indicating symbol is statically located over a face, overlaying an actuable target confirmation symbol to the 3D-view,
- upon actuating the target confirmation symbol:
  - selecting the surveying target based on the location of the surveying target indicating symbol, and
  - instructing the UAV, wherein the distance measuring module has a horizontally oriented measuring field of view, to
    - fly to a target location having a predefined relative position relation to the surveying target, and
    - orient the UAV towards the target, such that the measuring field of view is facing the surveying target.

3. Computer implemented UAV control method according to claim 1 creating the impression of being displayed in an orientation matching the orientation of a face over which the surveying target indicating symbol is located, is based on projecting the surveying target indicating symbol onto the face and displaying the projection of the surveying target indicating symbol.

4. Computer implemented UAV control method according to claim 1, the surveying target indicating symbol being a ring-shaped symbol.

5. Computer implemented UAV control method according to claim 1, wherein the 3D-data is derived from two-dimensional images provided by a camera of the UAV in a live-view of the environment.

6. Computer implemented UAV control method according to claim 1, wherein the 3D-data is based on a 3D-point cloud comprising at least measured 3D-coordinates of object points of the UAV's environment.

7. Computer implemented UAV control method according to claim 6, wherein the 3D-coordinates of the object points are measured by the distance measuring module of the UAV.

8. One or more non-transitory computer-readable media having instructions which, when executed by one or more processors, cause the computer to carry out the UAV control method according to claim 1.

* * * * *